Patented June 28, 1938

2,121,976

UNITED STATES PATENT OFFICE 2,121,976

METHOD FOR INCREASING THE OILINESS VALUE OF LUBRICATING OILS AND LUBRICATING OILS PREPARED BY SUCH METHOD

Louis A. Mikeska and Charles A. Cohen, Elizabeth, N. J., assignors to Standard Oil Development Company, a corporation of Delaware No Drawing. Application December 29, 1934, Serial No. 759,736

10 Claims. (Cl. 87—9)

The present invention relates to methods for improving lubricating oils especially in respect to their oiliness characteristics and more specifically to blended mineral oil lubricants containing esters in relatively small concentrations.

There has been considerable attention given during the past few years to methods for improving lubricating oils especially in respect to their oiliness values. Mineral oils are not naturally endowed with a sufficient degree of oiliness for many of the lubricating problems of the present time and this has been remedied most successfully by the addition of small amounts of high boiling esters to the mineral lubricating oil.

Various ester materials have been used and a considerable increase in the oiliness value is obtained by the addition of almost any type of ester. However, it is found that the synthetic esters are generally better than the naturally occurring esters such as are found in the fats and fatty oils. It has now been found that these materials whether natural or artificial can be considerably improved by treatment with sorptive (i. e. absorptive or adsorptive) materials, and while the reason for the improvement is not known at the present time, it is believed to be due to the removal of relatively small amounts of substances of unknown constitution which prevent the esters from accomplishing their best results. This is believed to be the case not only with the natural but also with synthetically prepared esters.

The treatment, as stated above, is accomplished by the action of sorptive materials. Among these, the active clays, such as for example the commercial clays which are sold under the following names: fuller's earth, Attapulgus clay, Terrana clay, Marsil clay and Floridin clay, are perhaps the most desirable, but other sorptive agents such as alumina, silica and active carbon may also be used, depending upon the nature of the material to be treated. The treatment may consist either in percolation through a bed of the sorptive material or agitation with a relatively small amount of the material which can then be separated by filtration. Ordinarily, from about 1½ to 3% of clay or other alkaline solid sorptive agent may be used, that is from 1 to 40 pounds of clay per barrel of the ester, but preferably between 4 to 10 lbs. per barrel. The contact should be maintained for a sufficient period, which depends on several factors, such as temperature, the particular nature of the ester, the sorptive material used. Generally, a percolation period of 15 to 45 minutes is sufficient to produce the desired result. The treatment may be carried out in the cold, but it is greatly improved if the ester material is maintained in a heated condition. As will be understood, the temperature should not be sufficiently high to bring about substantial decomposition, and in general temperatures from 100 to 150° C. have been found to be satisfactory. At these temperatures with a good grade of clay, the treatment may usually be accomplished in about one-half hour.

The materials which will be improved by the process outlined above broadly include esters, particularly those having boiling points above about 150° C. Fats and fatty oils may be used as well as the natural waxes. Among such materials may be noted rapeseed oil, wool oil, sperm oil and the like, olive oil, menhaden oil, lard oil and their equivalents. Modified natural oils may also be used, in particular those naturally containing unsaturated bonds or hydroxyl groups. These may be modified, for example, by esterification, such as acetylation and/or by hydrogenation or by both of these treatments. Acetylated castor oil or wool oil and hydrogenated acetylated castor oil may be cited as an example of this type of material. Modified esters, such as those obtained by subjecting naturally occurring fats, fatty oils, or the esters contained therein, to treatments causing a substantial change in their viscosity or solubility characteristics, are included within the class of synthetic esters of the present invention and the claims.

Among the synthetically prepared esters may be included generally the mono-, di- and polyalcoholic esters of acids of the class of oleic and stearic or of naphthenic acids such as are derived from some of the crude petroleums. The acids derived from paraffin wax by oxidation at low temperatures or from highly purified mineral oils may be used. These synthetic esters may be made from all of the alcohols ranging from the short chain members of the type of ethyl and isopropyl alcohol up to the higher members of the series such as lauryl or octadecyl. Low molecular weight acids such as acetic or propionic may be used especially where a high molecular weight alcohol or hydroxylated body is employed. Esters of inorganic acids, as for example tricresyl phosphate, dibutyl phthalate, amyl borate, and the like are contemplated.

The amount of the ester may vary from about $\frac{1}{10}$ to 5%, more or less, but ordinarily from 1 to 3% is employed in order to produce a good grade of motor oil or a motor oil which might be used not only generally for the lubrication of automotive engines but also for the purpose of "breaking in" new or "green" engines. The esters are preferably treated with the sorptive agent before it is added to the mineral oil but the treatment may be carried out after mixing of these two ingredients, although this method generally requires more time or a larger quantity of treating agent.

The present treatment method is not intended to take the place of other refining methods to which ester materials may be subjected, but is designed to increase the oiliness property of the ester blends in addition to ordinary purification in respect to color, odor and the like.

The oils which may be blended with the agents disclosed above, range from the lightest to the heaviest grades made from petroleum oils, and while they may be used generally for all purposes to which lubricants of the type are ordinarily put, they are particularly advantageous for the lubrication of automotive engines. For this purpose, they may be added to all of the S. A. E. grades of motor lubricating oils, both the winter and summer grades.

No particular specifications need be given for the oil used in the above blends but crude, partially refined, or highly refined, may be employed, although they are preferably well refined and may be produced by the ordinary methods of petroleum refining, such as treatment with acid and alkali, or by the special methods involving hydrogenation, destructive hydrogenation or solvent extraction.

The lubricating oil blends may contain other ingredients besides the oiliness agents, for example, dyes, pour inhibitors, soaps, sludge dispersers and oxidation inhibitors and the like. None of these materials interfere in any way with the action of the oiliness agent.

To further illustrate the nature of the present oils and the methods by which they are manufactured, the following examples may be considered:

Example I

Sperm oil was esterified with acetic acid by means of a small amount of sulphuric acid. The reaction was carried out in benzol solution and the product was carefully washed, freed of acid and benzol and dried.

One sample of this ester prepared as above was treated with 10% by weight of Attapulgus clay by agitation at 135° C. for about 1 hour, after which the clay was removed by filtration.

Blends were now prepared by adding 2% of the clay treated and of the untreated ester respectively to different samples of an S. A. E. 20 lubricating oil. These blends were then tested on the Mougey machine according to the method described in National Petroleum News, November 11, 1931, at page 47. The blend containing the clay treated ester carried the full 25 weights of the specified test with a final friction of 20 ft. pounds, while the untreated ester carried the 25 weights but with a frictional value of 65 ft. pounds.

Both esters greatly improved the oiliness value of the mineral oil but the clay treated ester was considerably more effective than the untreated.

Example II

Wool oil was esterified with acetic acid in about the same manner as described in Example I. The blend containing 2% of this ester which had not been clay treated failed at the 19th weight. A similar blend of a clay treated ester carried 25 weights with a frictional value of 100 ft. pounds.

Example III

A mixture of higher alcohols was separated from a paraffin wax oxidation product and was esterified with acetic acid. As in previous examples, blends were made up with 2% of such esters treated with 10% of clay and untreated respectively. Both samples carried the 25 weights on the Mougey machine, but whereas the final friction was 34 ft. pounds with the ester which had not been treated, it was only 23 with the clay treated sample.

The present invention is not to be limited by any theory of the mechanism of the oil agent nor of the method for improving its oiliness properties nor indeed to any particular absorptive agent or ester material but only to the following claims in which it is desired to claim all novelty inherent in the invention.

We claim:

1. Improved lubricating oil composition comprising a mineral lubricating oil containing dissolved therein a small amount of a synthetic ester boiling above 150° C. and having the characteristics of increasing the oiliness of said lubricating oil, said ester having been treated to improve its oiliness properties with a solid sorptive agent without subsequent heating sufficient to cause decomposition or polymerization of the thus treated ester.

2. Composition according to claim 1 in which the ester has been treated with an alkaline solid adsorptive agent of the type of clay.

3. Composition according to claim 1 in which a synthetic ester is used which has been subjected to treatment with clay at a temperature from 100 to 150° C. for a time sufficient to improve its oiliness properties.

4. Composition according to claim 1 containing from $\frac{1}{10}$ to 5% of a synthetic ester boiling above 150° C. which has been subjected to treatment with adsorptive clay for about ½ hour at a temperature from 100 to 150° C.

5. Method for preparing improved lubricating oil compositions of high oiliness characteristics, comprising subjecting a synthetic ester boiling above 150° C. and having the characteristic of increasing the oiliness value of mineral lubricating oils, to treatment with a solid sorptive agent in order to improve the oiliness properties of said ester and dissolving a small amount of the thus treated ester without subsequent heating sufficient to cause decomposition or polymerization thereof, in a mineral lubricating oil.

6. Composition according to claim 1, in which said organic acid is a fatty acid.

7. Composition according to claim 1, in which said ester is a synthetic ester of a high molecular weight aliphatic alcohol and a low molecular weight fatty acid.

8. Method according to claim 5 in which said sorptive agent is an adsorptive clay.

9. Method according to claim 5 in which said treatment comprises subjecting the ester to contact with an adsorptive clay at a temperature of about 100 to 150° C.

10. Method according to claim 5 in which the resulting composition contains about 0.1% to 5% of said treated ester.

LOUIS A. MIKESKA.
CHARLES A. COHEN.